United States Patent Office 2,918,464
Patented Dec. 22, 1959

2,918,464

DIQUATERNARY AMMONIUM COMPOUNDS AND THE MANUFACTURE THEREOF

Albert Gordon Caldwell, London, England, assignor to Burroughs Wellcome & Co. (U.S.A.) Inc., Tuckahoe, N.Y., a corporation of New York No Drawing. Application April 3, 1957
Serial No. 650,288

Claims priority, application Great Britain April 6, 1956

1 Claim. (Cl. 260—243)

The present invention relates to novel diquaternary compounds and to their manufacture.

It has been found that compounds falling within the general Formula I have the property of blocking ganglion transmission when tested in experimental animals, for example, the cat.

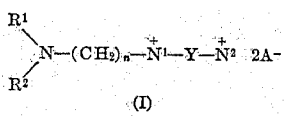

(I)

In this formula, $R^1$ and $R^2$ are either each a phenyl group or they together form with the neighbouring nitrogen atom a carbazole, a phenoxazine or a phenothiazine ring system or the sulphoxide or the sulphone of a phenothiazine ring system; $n$ is an integer from two to ten;

$\overset{+}{N^1}$ is a quaternary nitrogen atom carrying two alkyl groups which may be methyl or ethyl groups;

$\overset{+}{N^2}$ is a quaternary nitrogen atom carrying at least one methyl or ethyl group and either carrying two further alkyl groups, which may be methyl or ethyl groups, or forming part of a pyrrolidine, piperidine or morpholine ring; Y is an alkylene chain having two or three carbon atoms; and $A^-$ is an anion of an inorganic or organic acid which may be, for example, halide or alkyl sulphate.

These compounds possess extremely powerful pharmacological properties resembling, but in many ways considerably greater than those of known ganglion blocking agents such as hexamethonium and pentolinium. Thus, when injected into cats and dogs they lower the blood pressure and block the hypertensive action of the ganglion stimulating substance DMPP ($N^1$:$N^1$-dimethyl-$N^2$-phenyl-piperazinium iodide) while increasing the hypertensive effects of adrenaline and noradrenaline. They strongly inhibit gastric secretion and bradycardia of vagal origin and cause mydriasis and yet have little effect on the peripheral actions of acetylcholine. In vitro they are powerful inhibitors of the peristaltic reflex of the isolated guinea-pig ileum but are only weak antagonists of locally applied acetylcholine.

The intensity of the various autonomic actions of the examples described in this application varies with the chemical constitution of the example, the nature of the action and the animal species in which the action is measured. Many of the compounds described are considerably more active than known ganglion blocking agents such as hexamethonium and pentolinium in inhibiting DMPP hypertension and preventing vagal bradycardia in cats, and have the additional advantage of a much longer duration of action.

The present invention in one aspect, therefore, comprises compounds of the general Formula I.

These compounds may be prepared by any suitable synthetic route.

According to the present invention in another aspect, compounds of the general Formula I are prepared by treating a suitable amine of the general Formula II with a quaternising agent, such as a lower alkyl halide or lower dialkyl sulphate.

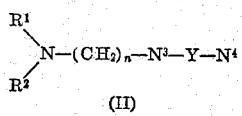

(II)

In this formula $R^1$, $R^2$, Y and $n$ have the meanings given above, $N^3$ is a secondary, tertiary or quaternary nitrogen atom and $N^4$ is a primary, tertiary or quaternary nitrogen atom, the substituents provided by the quaternising agent, together with any substituents on $N^3$ and $N^4$, being such as will give the desired substitution in the compound of general Formula I.

Thus, for example, $N^3$ may be a tertiary nitrogen atom carrying one methyl or ethyl group and $N^4$ may be a tertiary nitrogen atom carrying two alkyl groups which may be methyl or ethyl groups or may form part of a pyrrolidine, piperidine or morpholine ring.

The quaternisation reaction may be carried out by allowing the amine to stand with or by heating it with a quaternising agent such as a lower alkyl halide, in a suitable solvent such as acetone or methanol with the addition where necessary of an acid binding agent, for example, sodium carbonate.

Compounds of the Formula II where $N^3$ is a secondary or a tertiary nitrogen atom and $N^4$ is a tertiary nitrogen atom may be synthesised by the following routes.

A sodio compound of the Formula III is reacted with a polymethylene-$\alpha$:$\omega$-dihalide of the Formula IV, where $n$ has the meaning given above and where $Z^1$ and $Z^2$ are suitable different halogen atoms, for example, iodine and chlorine atoms respectively, in a suitable solvent, for example, liquid ammonia, to give a compound of the Formula V.

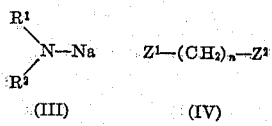

(III)         (IV)

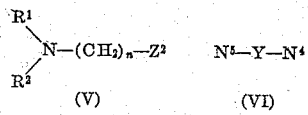

(V)         (VI)

Where the groups $R^1$ and $R^2$ in the compound of Formula II are each a phenyl group or together form with the neighbouring nitrogen atom a carbazole, a phenoxazine or a phenothiazine ring system, the compound of Formula V is reacted with a diamine of the Formula VI, where Y and $N^4$ have the meanings previously given and $N^5$ is a primary or secondary nitrogen atom, in a suitable solvent, for example, ethanol, to give the required compound of Formula II.

Where the groups $R^1$ and $R^2$ in the compound of Formula II together form with the neighbouring nitrogen atom the sulphoxide or the sulphone of a phenothiazine ring system, the compound of Formula V is oxidised, by means of hydrogen peroxide in ethanol, for example, to give the corresponding sulphoxide of Formula VII or, by means of hydrogen peroxide in glacial acetic acid, for example, to give the corresponding sulphone of Formula VIII.

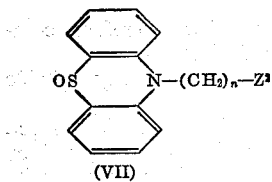
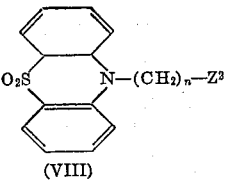

(VII)    (VIII)

To obtain the required compound of Formula II, the sulphoxide of Formula VII or the sulphone of Formula VIII is then reacted with a diamine of the Formula VI, in a suitable solvent, for example, ethanol.

The invention will now be further described with reference to the examples given below in which degrees of temperature are degrees centigrade. In these examples, the preparation of the iodide is described because generally the iodide is an easily crystallisable salt. However, the methods described are also applicable to the preparation of other salts. Also, the iodide may be converted into other salts; treatment with silver chloride, for example, gives the chloride, and contact with a suitable ion exchange resin gives the hydroxide, which may be converted into any desired salt.

Example 1

Liquid ammonia (600 ml.), contained in a flask surrounded by a cooling bath, was stirred, and a few small pieces of sodium were added, followed by a crystal of ferric nitrate. When the blue solution had become colourless, more sodium (total 7.8 g.) was added in pieces and stirring was continued for 1 hour. Diphenylamine (50.7 g.) was added to the cooled mixture over about 20 minutes and stirring was continued for a further 1 hour. 1-chloro-4-iodobutane (65.5 g.) was added dropwise over 30 minutes and the mixture was stirred in the cooling bath for another 1 hour, after which the cooling bath was removed, and the ammonia allowed to evaporate overnight at room temperature. The dark residue was extracted with hot light petroleum (boiling point 60–80°), the solvent was evaporated, and the residual oil was distilled, to give N-(4-chlorobutyl)diphenylamine, boiling point 124–128°/0.05 mm. (Benoit, Delavigne and Eliopoulo, Chemical Abstracts, 1953, 47, 2148e, give a boiling point of 210–211°/16 mm.).

A solution of N-(4-chlorobutyl)diphenylamine (7.8 g.) and β-piperidinoethylmethylamine (8.5 g.) in ethanol (25 ml.) was refluxed for 6 hours. The solution was evaporated to dryness and the residue was treated with excess dilute hydrochloric acid. The solution was washed with chloroform and then made alkaline with sodium hydroxide solution, and the precipitated oil was extracted with chloroform. The dried extract was evaporated, and the residue was distilled to yield N-[4-(β-piperidinoethylmethylamino)butyl]diphenylamine, boiling point 168–170°/0.01 mm.

The dihydrochloride, prepared by the addition of ethereal hydrogen chloride to a solution of the base in isopropanol, crystallised from isopropanol in small colourless plates, melting point 230–232°.

The base (2 g.) in methanol (10 ml.) was refluxed with methyl iodide (5 ml.) for 16 hours. The solution was evaporated to dryness, and the residue was recrystallised from ethanol to give colourless needles, melting point 172–174°, of N-[4-(β-piperidinoethylmethylamino)butyl]diphenylamine dimethiodide.

By the reaction of N-(4-chlorobutyl)diphenylamine with the appropriate diamine under the conditions described above, the following bases were prepared and converted to their dihydrochlorides and dimethiodides as described above:

N-[4-(β-morpholinoethylmethylamino)butyl]diphenylamine, boiling point 180–182°/0.05 mm. (dihydrochloride, melting point 221–223°; dimethiodide, melting point 192–194°).

N-[4-(β-diethylaminoethylmethylamino)butyl]diphenylamine, boiling point 167–170°/0.04 mm.; (dimethiodide, melting point 115–118°).

N-[4-(β-pyrrolidinoethylmethylamino)butyl]diphenylamine, boiling point 174–181°/0.04 mm. (dihydrochloride, melting point 221–223°; dimethiodide, melting point 186–188°).

Example 2

Using sodamide in liquid ammonia as described in Example 1, diphenylamine and 1-chloro-5-iodopentane were condensed together to give N-(5-chloropentyl)diphenylamine, boiling point 136–137°/0.01 mm. (Benoit, Delavigne and Eliopoulo, Chemical Abstracts, 1953, 47, 2148e, give a boiling point of 220–223°/20 mm.)

N-(5-chloropentyl)diphenylamine reacted with β-piperidinoethylmethylamine under the conditions described in Example 1 to give N-[5-(β-piperidinoethylmethylamino)pentyl]diphenylamine, boiling point 188–190°/0.01 mm. By the methods of Example 1, this base was converted to its dihydrochloride, melting point 207–209° and its dimethiodide, melting point 207–209° (with effervescence).

Similarly, the following compounds were prepared:

N-[5-(β-diethylaminoethylmethylamino)pentyl]diphenylamine, boiling point 170–173°/0.01 mm. (dimethiodide, melting point 217° (with effervescence.))

N-[5-(β-morpholinoethylmethylamino)pentyl]diphenylamine, boiling point 192–198°/0.01 mm. (dihydrochloride, melting point 200–202°; dimethiodide, melting point 206° (with effervescence.))

N-[5-(β-pyrrolidinoethylmethylamino)pentyl]diphenylamine, boiling point 179–186°/0.05 mm. (dimethiodide, melting point 225° (with effervescence)).

Example 3

By the procedure described in Example 1, N-(9-chlorononyl)diphenylamine, boiling point 170–172°/0.01 mm., was prepared from diphenylamine and 1-chloro-9-iodononane. N-(9-chlorononyl)-diphenylamine and β-piperidinoethylmethylamine reacted together under the conditions described in Example 1 to give N-[9-(β-piperidinoethylmethylamino)nonyl]diphenylamine, which was isolated as its dihydrochloride, melting point 235°, with decomposition.

The base, treated with methyl iodide as in Example 1, gage N-[9-(β-piperidinoethylmethylamino)nonyl]diphenylamine dimethiodide as plates, melting point 190–192°, after crystallisation from isopropanol.

Example 4

To a suspension of sodamide in liquid ammonia (prepared from sodium (2.6 g.) as described in Example 1) was added carbazole (16.7 g.) over 20 minutes. After stirring for 1 hour, 1-chloro-5-iodopentane (25.6 g.) was added over 45 minutes, and the mixture was cooled and stirred for a further 1 hour. The cooling bath was removed, and ammonia was allowed to evaporate overnight at room temperature. Water was added to the residue and the insoluble solid was collected and washed with water. Recrystallisation from methanol gave 9-(5-chloropentyl)carbazole as colourless needles with a blue fluorescence, melting point 60–61°.

The foregoing chloro-compound and β-piperidinoethylmethylamine reacted under the conditions described in Example 1 to give 9-[5-(β-piperidinoethylmethylamino)pentyl]carbazole as a viscous oil with a blue fluorescence, boiling point 217–219°/0.01 mm. The dihydrochloride of the base formed colourless prisms, melting point 226–230°. The dimethiodide of the base was obtained, by the method of Example 1, as a light brown powder of low and indefinite melting point.

The following compounds were prepared similarly from 9-(5-chloropentyl)carbazole and the appropriate diamine:

9-[5-β-pyrrolidinoethylmethylamino)pentyl]carbazole, boiling point 210–214°/0.02 mm. (dimethiodide, solid of low and indefinite melting point).

9-[5 - (β - morpholinoethylmethylamino)pentyl]carbazole, boiling point 214–216°/0.02 mm. (dimethiodide, melting point 196–198°, with effervescence).

*Example 5*

To a suspension of sodamide in liquid ammonia (prepared from sodium (2.6 g.) as described in Example 1), was added phenothiazine (19.9 g.) in portions over 20 minutes, and the mixture was stirred for 1 hour. 1-bromo-3-chloropropane (17.3 g.) was added dropwise over 30 minutes, and the stirring was continued for a further 1 hour, after which the cooling bath was removed, and the ammonia was left to evaporate at room temperature. The residue was extracted with hot light petroleum (boiling point 60–80°) and the extract was evaporated to leave a purple oil. This was dissolved in methanol, and the solution was treated with charcoal and allowed to crystallise, yielding large prisms of 10-(3-chloropropyl)-phenothiazine, melting point 67–69° (Gilman and Shirley, J. Amer. Chem. Soc. 1944, 66, 888 give a melting point of 60°).

A solution of 10-(3-chloropropyl)phenothiazine (13.4 g.) in a mixture of ethanol (50 ml.) and benzene (15 ml.) was added dropwise over 3 hours to a refluxing solution of β-diethylaminoethylamine (11.6 g.) in ethanol (10 ml.) and the solution was boiled for a further 21 hours. The basic product was worked up into chloroform, and distilled, giving 10-[3-(β-diethylaminoethylamino)propyl]-phenothiazine as a viscous oil, boiling point 192–194°/0.01 mm. The dihydrochloride crystallised from a mixture of isopropanol and light petroleum (boiling point 60–80°) as shining plates, melting point 148–150°.

The above base (4.5 g.) was dissolved in methanol (22.5 ml.), anhydrous sodium carbonate (7.5 g.) and methyl iodide (7.5 ml.) were added, and the mixture was refluxed for 5½ hours. The cooled mixture was filtered, and the filtrate was evaporated to dryness. The residue was dissolved in hot ethanol, the solution depositing a gum on cooling. The liquid was decanted, and the gum was rubbed with isopropanol to give a colourless solid which was a hydrate of 10-[3-(β-diethylaminoethylmethylamino)propyl]phenothiazine dimethiodide. It softened at 75–80° and melted with effervescence at about 100°.

*Example 6*

Using the same conditions as described in Example 5, sodiophenothiazine was treated with 1-bromo-4-chlorobutane, and the product was distilled to give 10-(4-chlorobutyl)phenothiazine as a pale yellow oil, boiling point 164–166°/0.01 mm. (Robinson and Cusic, U.S. patent specification No. 2,590,125 give a boiling point of 205–210°/1 mm.).

A solution of this chloro-compound (13.5 g.) and γ-aminopropylmorpholine (13.5 g.) in ethanol (30 ml.) was refluxed for 24 hours. The basic product was distilled to give 10-[4-(γ-morpholinopropylamino)butyl]-phenothiazine as a viscous oil, boiling point 230–234°/0.01 mm. The dihydrochloride of this base crystallised from slightly aqueous isopropanol as colourless needles, melting point 218–220°.

10 - [4 - (γ - morpholinopropylamino)butyl]phenothiazine (5 g.) was treated with methyl iodide (10 ml.) in the presence of sodium carbonate (10 g.), as described in Example 5, to give 10-[4-(γ-morpholinopropylmethylamino)butyl]phenothiazine dimethiodide. This salt, on recrystallisation from ethanol, was deposited as a gum which slowly solidified and had a melting point of 95–105°.

*Example 7*

A solution of 10-(4-chlorobutyl)phenothiazine (8.7 g.) and β-morpholinoethylmethylamine (11 g.) in ethanol (20 ml.) was boiled under reflux for 16 hours. The solution was evaporated to dryness under diminished pressure and the residue was treated with excess dilute hydrochloric acid. The aqueous solution was washed with chloroform and then basified with sodium hydroxide solution. The precipitated oil was extracted with chloroform, and the extract was washed with water, dried, and evaporated to remove the chloroform. The dark residue was dissolved in ethanol, and excess of an ethanolic solution of oxalic acid was added. The precipitated solid was just dissolved by the gradual addition of water to the hot suspension, and the solution was allowed to cool. The solid which crystallised was recrystallised from water to give small plates, melting point 208° (with effervescence), of 10-[4-(β - morpholinoethylmethylamino)butyl]phenothiazine di(hydrogen oxalate).

The oxalate was suspended in water and sodium hydroxide solution was added to precipitate the base, which was extracted with chloroform. The oil remaining after evaporation of the washed and dried extract was boiled with methyl iodide in methanol as described in Example 1, to give 10-[4-(β-morpholinoethylmethylamino)butyl]phenothiazine dimethiodide as small plates, melting point 210° (with effervescence) after crystallisation from methanol.

*Example 8*

The reaction of sodiophenothiazine with 1-chloro-5-iodopentane under the conditions described in Example 5 gave 10-(5-chloropentyl)phenothiazine as a viscous pale yellow oil, boiling point 172–174°/0.01 mm. A solution of this chloro-compound (10.1 g.) and β-piperidinoethylmethylamine (9.5 g.) in ethanol (20 ml.) was boiled for 5¼ hours. The basic product was worked up into chloroform and distilled to give 10-[5-(β-piperidinoethylmethylamino)pentyl]phenothiazine as a viscous yellow oil, boiling point 213–218°/0.01 mm. The di(hydrogen oxalate) of this base, prepared by treating a solution of the base in ethanol with excess ethanolic oxalic acid, crystallised from water as small colourless plates, melting point 195–198°. 10-[5-(β-piperidinoethylmethylamino)-pentyl]phenothiazine dimethiodide, prepared by treating the base with methyl iodide as described in Example 1, had a melting point of 147–150° after crystallisation from ethanol.

*Example 9*

To a suspension of 10-(5-chloropentyl)phenothiazine (2 g.) in ethanol (20 ml.) was added hydrogen peroxide (5 ml. of 30%) and the mixture was boiled for 5 hours. The reaction mixture was evaporated to small volume, water was added, and the precipitated oil was extracted with chloroform. The washed and dried extract was evaporated to leave an oil which solidified when rubbed under light petroleum (boiling point 60–80°). Recrystallisation from cyclohexane (charcoal) gave colourless plates, melting point 110–111°, of 10-(5-chloropentyl)phenothiazine-5-oxide.

Reaction of the foregoing chloro-compound with β-morpholinoethylmethylamine, followed by treatment of the crude product with oxalic acid, as described in Example 7, gave 10-[5-(β-morpholinoethylmethylamino)-pentyl]phenothiazine-5-oxide di(hydrogen oxalate) as plates, melting point 215° (with effervescence), from water.

The oxalate was converted to the base, and this was treated with methyl iodide, as described in Example 7, to give 10-[5-(β-morpholinoethylmethylamino)pentyl]-phenothiazine-5-oxide dimethiodide, forming plates, melting point 235° (with decomposition), from water.

Example 10

A solution of 10-(5-chloropentyl)phenothiazine (2 g.) in glacial acetic acid (10 ml.) was shaken at room temperature during the addition of hydrogen peroxide (5 ml. of 30%), after which the whole was heated on the steam-bath for 3 hours. Water was added to the hot solution until solid just appeared, and the mixture was left to cool. The solid which crystallised was recrystallised from methanol to give colourless plates, melting point 111–113°, of 10-(5-chloropentyl)phenothiazine-5:5-dioxide.

The reaction of the foregoing chloro-compound with β-morpholinoethylmethylamine, and the isolation of the product as oxalate, were conducted as described in Example 7, to give 10-[5-(β-morpholinoethylmethylamino)pentyl]phenothiazine-5:5-dioxide di(hydrogen oxalate), melting point 218° (with effervescence).

By the method of Example 7, this oxalate was converted to 10-[5-(β-morpholinoethylmethylamino)pentyl]phenothiazine-5:5-dioxide dimethiodide, melting point 225° (with effervescence).

In exactly similar fashion, 10[5-(β-piperidinoethylmethylamino)pentyl]phenothiazine-5:5-dioxide di(hydrogen oxalate), melting point 214° (with effervescence), was prepared and converted into the corresponding dimethiodide, melting point 220° (with effervescence).

Example 11

A suspension of sodamide in liquid ammonia (ca. 200 ml.) was prepared from sodium (900 mg.) as described in Example 1. Phenoxazine (6.3 g.) was added over 20 minutes and after stirring for 1 hour, 1-chloro-5-iodopentane (9 g.) was added dropwise over 1 hour. The cooling bath was removed and the ammonia was allowed to evaporate. The residue was extracted with hot light petroleum (boiling point 60–80°), the solvent was evaporated and the residue was distilled. The oil which was collected at 170–190°/0.02 mm. soon solidified and was recrystallised from light petroleum (boiling point 40–60°), with charcoal, to give colourless prismatic needles, melting point 57–58°, of 10-(5-chloropentyl)phenoxazine.

A solution of this chloro-compound (3.5 g.) and β-morpholinoethylmethylamine (4 g.) in alcohol (10 ml.) was boiled for 6 hours. The crude basic portion was isolated in the normal fashion as a dark oil, which was dissolved in ethanol and treated with excess ethanolic oxalic acid to yield 10-[5-(β-morpholinoethylmethylamino)pentyl]phenoxazine di(hydrogen oxalate), which crystallised from water as small colourless plates, melting point 200°, with effervescence. 10-[5-(β-morpholinoethylmethylamino)pentyl]phenoxazine (1.9 g.), obtained from its di(hydrogen oxalate) by basification and extraction with chloroform, was dissolved in methanol (10 ml.), methyl iodide (3 ml.) was added and the solution was boiled for 16 hours, after which it was evaporated to dryness. The residue was recrystallised from water to give 10 - [5 - (β - morpholinoethylmethylamino)pentyl]phenoxazine dimethiodide as plates, melting point 210°, with decomposition.

I claim:

Compounds of the general Formula I

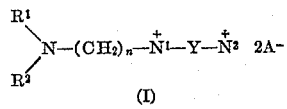

(I)

wherein $R^1$ and $R^2$ are radicals selected from the class consisting of phenyl groups and radicals which with the neighbouring nitrogen atom form a group selected from the class consisting of carbazole, phenoxazine, phenothiazine, sulphoxide of phenothiazine and sulphone of phenothiazine groups; $n$ is an integer from two of ten;

is a quaternary nitrogen atom having two alkyl groups connected therewith selected from the class consisting of methyl and ethyl groups;

$\overset{+}{N^2}$ is a quaternary nitrogen atom selected from the class consisting of quaternary nitrogen atoms connected with one alkyl group selected from the class consisting of methyl and ethyl groups and forming a group selected from the class consisting of pyrrolidine, piperidine and morpholine groups and quaternary nitrogen atoms carrying three alkyl groups selected from the class consisting of methyl and ethyl groups; Y is an alkylene chain having the number of carbon atoms selected from the class consisting of two carbon atoms and three carbon atoms; and $A^-$ is the anion of a therapeutically acceptable acid.

References Cited in the file of this patent

UNITED STATES PATENTS

| | | |
|---|---|---|
| 2,480,355 | Charpentier | Aug. 30, 1949 |
| 2,758,114 | Miescher | Aug. 7, 1956 |
| 2,783,237 | Cavallito et al. | Feb. 26, 1957 |

FOREIGN PATENTS

| | | |
|---|---|---|
| 168,173 | Australia | June 10, 1954 |
| 1,021,280 | France | Nov. 26, 1952 |
| 756,937 | Great Britain | Sept. 12, 1956 |